Feb. 25, 1930.  C. M. MULLIN  1,748,558
DIRIGIBLE HEADLIGHT FOR MOTOR VEHICLES
Filed Aug. 31, 1928  2 Sheets-Sheet 1

CHAS. M. MULLIN.
INVENTOR.
BY Harold C. Shipman
ATTORNEY.

Feb. 25, 1930.    C. M. MULLIN    1,748,558
DIRIGIBLE HEADLIGHT FOR MOTOR VEHICLES
Filed Aug. 31, 1928    2 Sheets-Sheet 2

CHAS. M. MULLIN,
INVENTOR.
BY Harold C. Shipman
ATTORNEY.

Patented Feb. 25, 1930

1,748,558

UNITED STATES PATENT OFFICE

CHARLES M. MULLIN, OF MEYRONNE, SASKATCHEWAN, CANADA

DIRIGIBLE HEADLIGHT FOR MOTOR VEHICLES

Application filed August 31, 1928. Serial No. 303,265.

This invention relates to dirigible headlights and more particularly to a means for retaining the turning mechanism in a tight condition when the lights are turned in either direction.

A further object of my invention is to provide a simple and efficient means whereby on the operation of the turning mechanism for the motor vehicle certain connecting parts operating on the standard retaining one light will cause a corresponding turning of the other standard and therefore the lights will turn and will be retained in uniform direction in accordance with the steering turning of the automobile.

With the foregoing and other objects in view, as will appear as the description proceeds, the invention consists of the novel construction, combination and arrangement of co-operating elements as hereinafter more specifically set forth, claimed and shown in the accompanying drawing forming a part of the present application in which:

Like numerals of reference designate corresponding parts throughout the different views.

Figure 1:
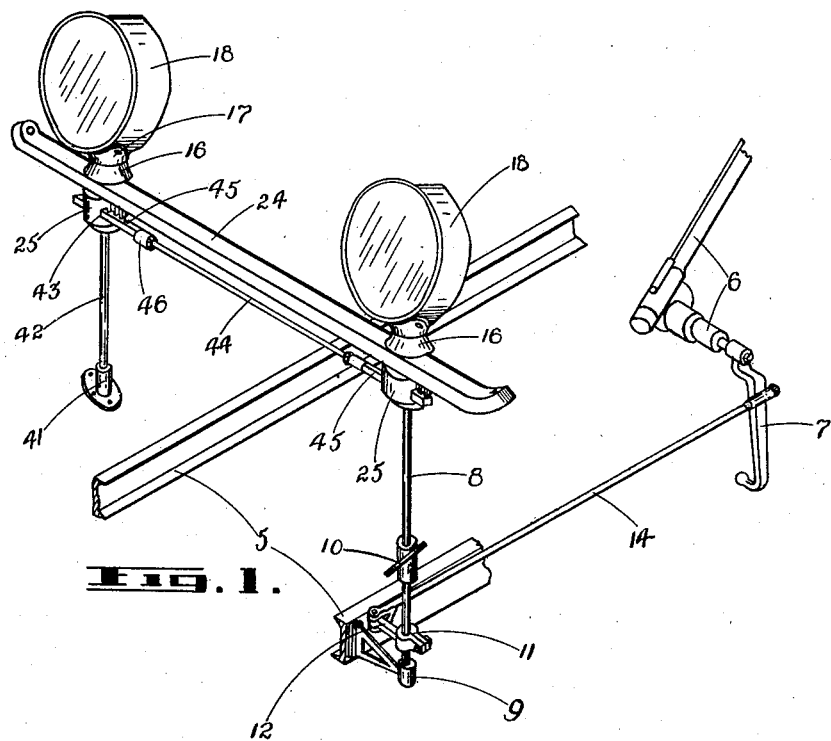
Fig. 1 is a perspective view of the preferred embodiment of my invention.
Figure 4:
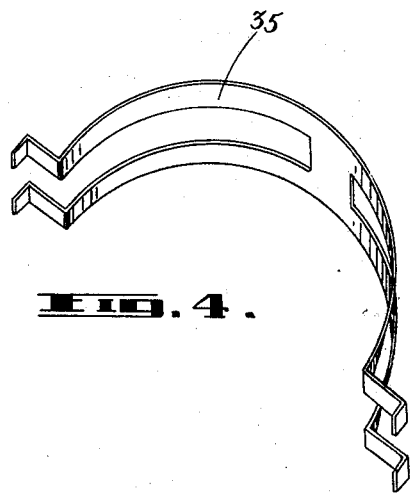
Fig. 4 is an enlarged detail view of the spring retaining member.

5 indicates the chassis, 6 the automobile steering mechanism and 7 the steering crank arm. 8 is a standard having one end pivoted in the bracket 9. This standard extends through a bearing block 10 retained on the mudguard in any suitable desired manner. 11 is a clamp suitably attached near the lower end of the standard 8 provided with an integral arm 12, which is pivotally connected to one end of the operating rod 14, the other end of said rod being connected to said steering crank arm.

The upper end of the standard 8 is squared as at 15 and extends up through a cap 16 upon which the bracket 17 of the light 18 normally is supported. This bracket 17 is securely retained on the cap 16 by the nut 19 threadedly engaged on the reduced outer portion of the squared end 15 of the standard. The cap 16 has integral therewith a cylindrical sleeve 16ª, which is square on its inner contour to fit around the squared end 15 of the standard, while the outer contour of this sleeve is of annular shape and fitted into a bearing member 20. Supported in the cap 16 is a wedged ball bearing cage 21 carrying the ball bearings 22, which ball bearings are seated in a ball race formed on the upper face of the outwardly directed flange on the upper end of the bearing member 20. The sleeve 16ª is retained in fixed position on the squared end portion 15 by means of the setscrew 23.

The bearing member 20 is positioned in a cross bar 24, details of which will be hereinafter mentioned. Suspended below the cross bar 24, I provide a cup-shaped housing 25, having upwardly directed lugs 26. At spaced distances around the upper edge thereof are lugs which engage to the under face of the cross bar 24 by means of the screws 27.

This housing is provided with an annular opening as at 28 through which the squared end 15 may turn. 29 is a spacing washer fitted on the bottom of the housing 25. 30 is a pinion gear having a squared shank 31 extending downwardly therefrom on which is mounted the winged block 32 having outwardly directed wing portions 33 and 34.

In spaced relation to the annular side wall of the housing 25, I provide guide brackets 35, one on each side of the wing portion 33—34. The ends of these guide brackets are bent to meet the inner contour of the annular side wall of the housing 25 and are suitably connected thereto in such a manner that the guide brackets 35 will be rigidly retained relative to the housing 25. Intermediate each guide bracket 35 and the side wall of the housing 25, I provide a coil spring 36, the opposite ends of which are provided with abutment plates 37, which plates are normally tensioned against the outwardly directed ends of the guide brackets 35. Each guide bracket has a longitudinal slot formed from its ends in which the wing portions 33—34 may travel when the winged block 32 is turned. During the rotation of this winged block 32, the wing portions 33—34 contact and carry with them the end of the spring 36, which takes up any play and acts as an anti-rattler for the various moving parts.

38 is a bearing plate suitably attached to the bottom of the housing 25 and provided with an annular opening therein registering opposite the annular opening in the bottom of said housing. 39 is a bearing block, having a ball race therein and provided with suitable bearings adapted to fit up tightly against the bearing plate 38 to provide a support therefor, this bearing block 39 being retained in fixed position relative to the squared end 15 of the standard by means of the setscrew 40.

Figure 2:
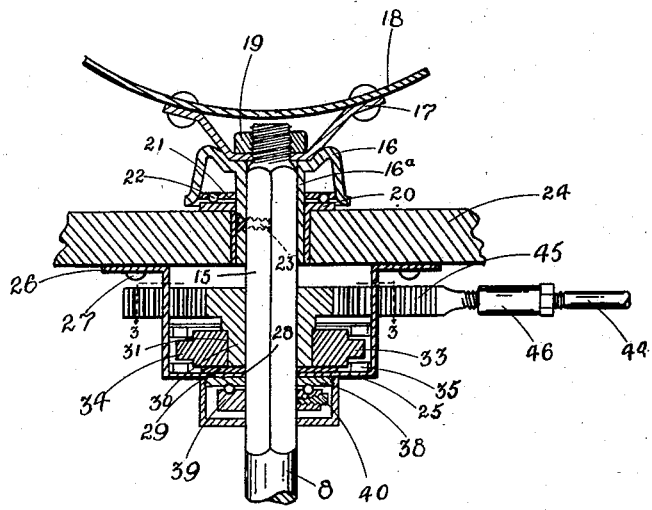
Fig. 2 is an enlarged sectional detail view of the working parts.
Figure 3:
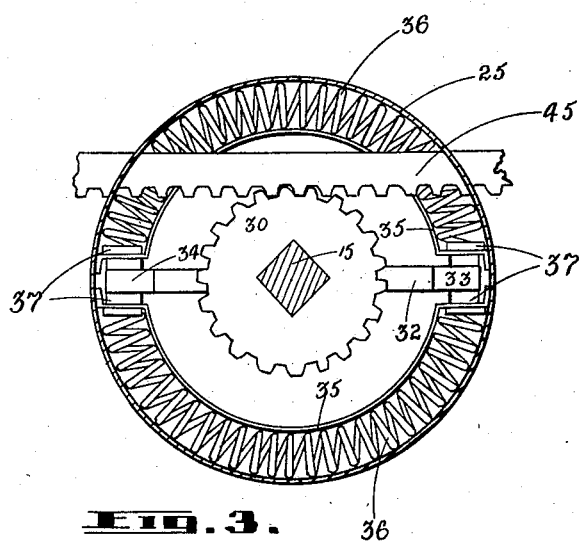
Fig. 3 is a plan view looking down from the line 3—3 of Fig. 2.

Suitably supported on the fender of the opposite side of the motor vehicle, I provide a bearing block 41 in which the end of the standard 42 is positioned for rotation. The upper end of this standard 42 is square similar to the standard 8 and is provided with a similar construction to that shown in Fig. 2.

The housings 25 are each provided with two oppositely registering openings 43, which openings are offset to one side slightly so as to permit the connecting rod 44, with its rack ends 45, to extend therethrough, the rack ends being engaged in the pinion gear 30. I provide a set of adjustment members 46 between the connecting rod 44 and the respective rack ends 45 so that the position of the lights relative to each other may be adjusted to obtain the desired result.

When in use, the operating of the steering crank arm 7 will cause a movement of the operating rod 14 which, through its connections, will turn the standard 8 and on the turning of the standard 8, the connecting rod 44, through its connections, will turn the standard 42, the turning of said standards, carrying with them the lamps 18 connected thereto, in simultaneous movement and in pre-determined relative relationship to the actual vehicle steering turning, according to the connecting parts intermediate the steering crank arm 7 and the squared portion 15 to which the lamps are connected.

The foregoing specification and annexed drawing disclose the preferred embodiment of my invention, but it is to be understood that minor changes may be resorted to in the commercial adaptation of my invention without departing from the scope of the invention as hereinafter claimed.

What I claim as new is:

Dirigible headlights consisting of a pair of upright standards suitably supported from a motor vehicle and a cross bar between the front fenders thereof; an operating rod, suitably connected between the steering gear mechanism of said motor vehicle and one of said standards; a lamp supported from the upper end of each of said standards; supporting means, under said lamp of said standard and supported on said cross bar; each of said standards being provided with a housing supported from the under side of said cross bar; a pinion gear carried in said housing; said pinion gear being provided with a squared shank; a winged block carried on said squared shank and rotated therewith; coil springs carried in said housing to retain the operating parts in tight connection when said standard is rotated; guide brackets for retaining said coil springs in proper position; each of said housings being provided with a pair of oppositely registering openings; a connecting rod; the ends of said connecting rod, having rack ends adjustably mounted thereon, which rack ends are engageably connected with said pinions and a ball bearing block member carried on each of said standards for retaining the fixed relationship between each standard and its respective housing.

In testimony whereof, I affix my signature.

CHARLES M. MULLIN.